United States Patent
Rixen et al.

[11] Patent Number: 6,062,764
[45] Date of Patent: *May 16, 2000

[54] INSERTED TONGUE

[76] Inventors: Wolfgang Rixen; Gerrit Pies, both of Friedenstrasse 107-109, 42699 Solingen, Germany

[*] Notice: This patent is subject to a terminal disclaimer.

[21] Appl. No.: 08/296,701

[22] Filed: Aug. 26, 1994

[30] Foreign Application Priority Data

Aug. 30, 1993 [DE] Germany .......................... 93 12 997 U

[51] Int. Cl.⁷ ................................................. F16B 37/04
[52] U.S. Cl. .......................... 403/387; 403/22; 411/104; 411/432
[58] Field of Search .............................. 403/22, 387, 381, 403/404, 362; 411/104, 84, 85, 432

[56] References Cited

U.S. PATENT DOCUMENTS

| | | | |
|---|---|---|---|
| 4,741,582 | 5/1988 | Peroni | 411/85 X |
| 4,758,124 | 7/1988 | Ingeberg | 411/85 |
| 5,037,258 | 8/1991 | Heurteux | 411/104 |
| 5,104,270 | 4/1992 | Ritzl | 411/85 |
| 5,192,145 | 3/1993 | Rixen et al. | 403/255 |

FOREIGN PATENT DOCUMENTS

| | | |
|---|---|---|
| 0516321 | 12/1992 | European Pat. Off. . |
| 1333810 | 6/1963 | France ................................. 403/404 |
| 1546776 | 10/1967 | France . |
| 1996313 | 7/1968 | Germany . |
| 6750452 | 1/1969 | Germany . |
| 1475239 | 7/1969 | Germany . |
| 1923669 | 11/1969 | Germany . |
| 3604989 | 8/1987 | Germany . |
| 9111163 | 1/1992 | Germany . |

*Primary Examiner*—Anthony Knight
*Attorney, Agent, or Firm*—Charles A. Wilkinson

[57] ABSTRACT

An inserted tongue adapted to slip into a T-shaped, undercut groove of a profiled bar has an essentially wedge-shaped cross section, the wedge apex line of which intersects the bottom center of the groove at a clamping point when the inserted tongue is in the groove. A threaded bore is provided in the inserted tongue perpendicular to the wedge apex line. In order that the inserted tongue can be manufactured more easily and cheaply, it is designed so that a portion of the wedge cross section is formed into a plastic spring clip, which extends longitudinally in the region of its wedge apex line, the free, spring-elastic end of which leg has a clamping point making contact with the floor of the contoured groove to stablize the inserted tongue within the groove of the profiled bar.

28 Claims, 1 Drawing Sheet

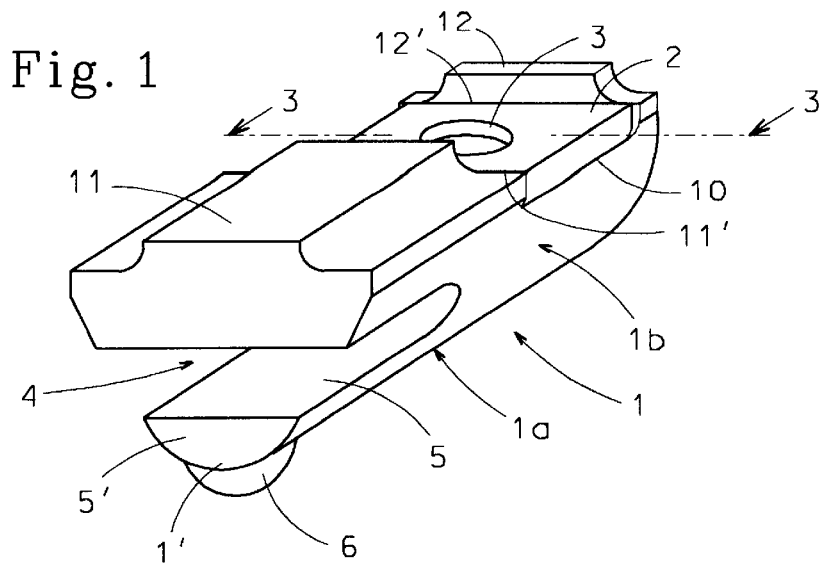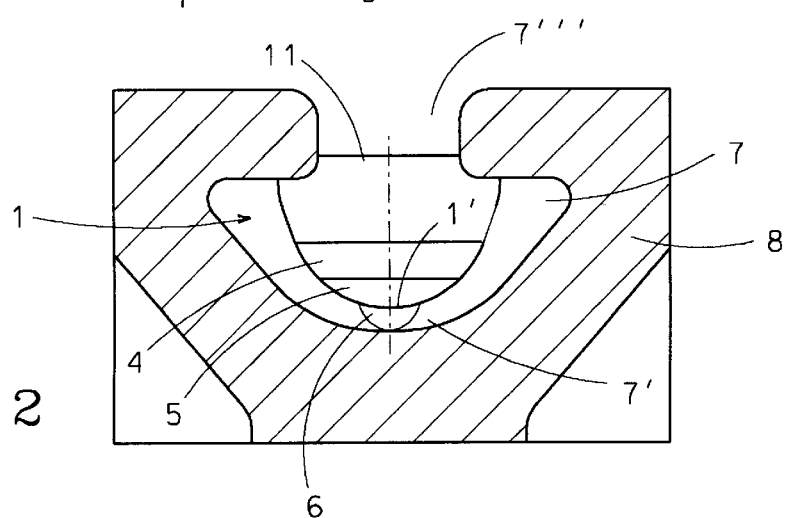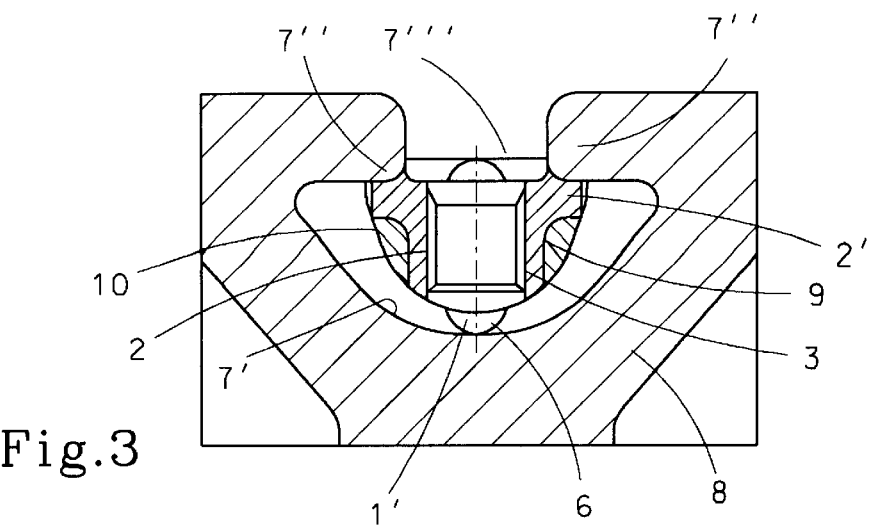

INSERTED TONGUE

The invention relates to an inserted tongue, which can be swung into T-shaped, undercut grooves of profiled bars or the like, with an essentially wedge-shaped cross section, the wedge apex line of which points to the contoured groove floor and contacts it at a clamping point when the inserted tongue is in its swung-in position, also with a threaded bore directed perpendicular to wedge apex line.

Inserted tongues of the above kind are known. They are generally used for a screw fastening of construction parts attached to profiled bars or the like, which are equipped with such undercut grooves. For this purpose, such construction parts are fixed by a fastening screw, which is turned into the threaded bore of the inserted tongue. The edges of the flat top side of the inserted tongue are pressed firmly against the underside of the contoured groove leg, which flanks the contoured groove slot on both sides. Because the inserted tongue has an essentially wedge-shaped cross-section, it need not necessarily be pushed into the contoured groove laterally. Rather, it can easily be swung into the contoured groove at any arbitrary point of the profiled bar. It can easily be clamped in the contoured groove in the appropriate axial position by means of the clamping point at the floor of the contoured groove. With known inserted tongues, the clamping point is situated in the region of the wedge apex line and is formed by a clamping ball, which is spring-mounted in a small bore in the inserted tongue by means of an appropriate pressure spring. The inserted tongue itself consists entirely of steel. However, it is still relatively expensive to manufacture this known inserted tongue, especially also as regards the nature and positioning of its clamping ball.

It is therefore an object of the invention to create an inserted tongue of the type mentioned in the introduction, which will retain the described advantages, but which can be manufactured much more simply and economically.

Starting from an inserted tongue of the type under discussion here, the invention accomplishes this object as follows: The inserted tongue has a leg comprised of a plastic spring clip, which extends longitudinally in the region of its wedge apex line, the free, spring-elastic end of said leg having a clamping point in contact with the floor of the contoured groove.

In this way, an inserted tongue, which is swung into the undercut groove, is simply clamped by the leg of a spring-clip situated thereon and consisting of a suitable, highly elastic plastic. This can be accomplished by an especially simple design, such that the leg of the spring clip only needs to run at a slight slant to the longitudinal extension of the inserted tongue and such that its free, sprung end contacts the floor of the contoured groove and thus forms a clamping point. However, it is still more advantageous for the clamping point to consist of a clamping knob integrally attached to the underside of the free end of the plastic leg of the spring clip.

According to another feature of the invention, the inserted tongue can have a plastic base section with a wedge-shaped cross section, which longitudinally is divided approximately in half, one side having a forked region with a longitudinal slot forming the leg of the spring clip and the other side having a bore-receiving region equipped with a metal insert bush, which contains the threaded bore. The above-mentioned plastic base part consists of an appropriate highly elastic plastic, for example, polyamide or polyacetal, which is also known by the abbreviation POM. It can easily be manufactured by injection molding. In that case, it is then only necessary to insert the metal bush which contains the threaded bore. For this purpose, the bore-receiving region (1b) of the plastic base section preferably has a penetrating receiving bore, which contains the metal insert bush and a flat recess disposed above this, with which the metal insert bush makes contact by means of an appropriate edge flange.

Furthermore, it is advantageous if, on the top of the plastic base section, anti-twisting protrusions are integrally attached to both sides of the metal insert bush, which contains the threaded bore, such that, when the inserted tongue is swung into the contoured groove, said protrusions extend into the outwardly directed slot of the contoured groove. In this way, the inserted tongue, which is swung into the contoured groove, is kept aligned sufficiently securely as regards both twisting and transverse movement. The protrusions which secure it against twisting simultaneously can also hold fast the metal bushings, which are inserted into the receiving bore. For this purpose, this bushing has a rectangular shaped edge flange. The clamping edges, which are situated at both edges of the anti-twist protrusions of the base section, can easily clamp by gripping the above edge flange. In principle, the metal insert bush can be fastened in the plastic base section also in other ways, by clamping or by appropriate gluing.

An advantageous embodiment of the inventive inserted tongue is shown on an enlarged scale in the drawing.

FIG. 1 shows a diagrammatic representation of the inserted tongue,

FIG. 2 shows a front view of a tongue inserted into a contoured groove of a profiled bar, which is here shown and cut, FIG. 3 shows a representation corresponding to FIG. 2, but sectioned according to the line III—III of FIG. 1.

The inserted tongue shown here has two parts. It consists of one plastic base section 1 with an essentially wedge-shaped cross section and of a metal bush 2 inserted therein, which has a threaded bore 3.

The base section 1 consists of a comparatively hard-elastic plastic, for example, polyamide or a polyacetal. It is divided longitudinally about half and half into two different regions or, in other words, about half of the longitudinal length of the base 1 may constitute a first region and about half may constitute a second region. It thus has a forked region 1a, on the one hand, and a bore-receiving region 1b, on the other. A longitudinal slot 4 is situated in the forked region 1a. This is used to form the leg 5 of the spring clip, which extends in the longitudinal direction of the wedge apex line 1' of the base section 1. The free end 5' of the leg 5 of the spring clip has a clamping knob integrally attached to its underside and forming a clamping point 6. By means of this clamping knob, the inserted tongue 1 is clamped to the floor 7' of the contoured groove when it is swung into the contoured groove 7 of a profiled bar 8 or the like, as shown in FIGS. 2 and 3. It is thus adequately protected against axial movement in the groove. However, in place of a specially formed clamping knob, the plastic leg 5 of the spring clip could also be designed so as to run at a slight slant relative to the longitudinal extent of the base section 1. In that case, its free, flexible end 5' would likewise make a clamping contact with the floor 7' of the contoured groove.

In the bore-receiving region 1b, the plastic base section 1, as FIG. 3 shows, has a receiving bore 9 for the bush 2, which is inserted therein and which preferably consists of deep-drawing steel. The insert bush 2 has a rectangularly shaped edge flange 2', which contacts a recess 10 in the plastic base section 1, said recess being situated above the receiving bore 9.

The top side of the plastic base section 1 furthermore has integrally attached protrusions 11, 12, which are situated on both sides of the metal insert bush 2, which contains the threaded bore 3. When the inserted tongue is swung into the contoured groove 7 according to FIGS. 2 and 3, these protrusions extend into the outwardly directed slot 7"' of the contoured groove 7 and thus provide adequate protection against twisting. At their edges 11' and 12', which face the insert bush 2, the protrusions 11 and 12 can also have slightly protruding clamping edges, which grip over the corresponding edges of the edge clamps 2' of the insert bush 2. The insert bush 2 can thus be very simply clamp-fastened in the plastic base section 1. However, it is understood that it can also be clamp-fastened in other ways. The insert bush 2 can also be glued in the base section 1.

As FIG. 3 shows, for a screw attachment through the inserted tongue, it is essential for the flange 2' of the metal insert bush 2 to be pressed directly and solidly against the underside of the contoured grooves 7", which flank the contoured groove slot 7"', thus creating a suitable metal-to-metal support. Despite the presence of the protrusions 11, 12 at the top of the plastic base section 1, this is readily possible since these protrusions only extend into the contoured groove slot 7"' in order to provide protection against twisting.

It is understood that modifications are also possible within the framework of the present invention. For example, several threaded bores can also be present, as necessary, in the inserted tongue or in its insert bush.

We claim:

1. An inserted tongue, adapted for sidewise insertion into T-shaped, under cut contoured grooves of profiled bars, comprising a tongue body having an essentially wedge-shaped cross section, with a wedge apex line substantially bisecting the wedge section and intersecting the contoured groove floor at a clamping point when the inserted tongue is in its inserted position, a threaded bore directed perpendicular to the wedge apex line and, wherein one end of the wedge portion of the inserted tongue is partially separated from the adjoining portion of the inserted tongue to form a free resilient leg of a plastic spring clip, which extends longitudinally in the region of the wedge apex line, the free, resilient end of said leg having a clamping point adapted for contact with the floor of the undercut contoured groove of the profiled bar.

2. The inserted tongue of claim 1 wherein such tongue has a plastic base section with a wedge-shaped cross section, which longitudinally is divided approximately in half, one end having a forked region with a longitudinal slot dividing the leg of the spring clip from the remainder of the body of the inserted tongue, and the other side having a bore-receiving region equipped with a metal insert bushing, which contains the threaded bore.

3. The inserted tongue of claim 2, wherein the bore-receiving region of the plastic base section has a penetrating receiving bore, which contains the metal insert bushing and a flat recess disposed above this, with which the metal insert bushing makes contact by means of an appropriate edge flange with the underside of the T-sections of the undercut contoured grooves.

4. The inserted tongue of claim 3, wherein, on the top of the plastic base section anti-twisting protrusions are positioned on both sides of the metal insert bushing, which contains the threaded bore, such that, when the inserted tongue is positioned within the undercut contoured groove, said protrusions extend into the outwardly directed slot of the undercut contoured groove.

5. The inserted tongue of claim 4, wherein the edge of the metal insert bushing has a rectangular contour and wherein clamping profiles are situated at those edges of the anti-twist protrusions, which face the edge flange, said clamping edges exerting a slight clamping grip over the corresponding edges of the edge flange.

6. The inserted tongue of claim 1, wherein the clamping point comprises a clamping knob integrally attached to the underside of the end of the free resilient leg of the plastic spring clip.

7. The inserted tongue of claim 6, wherein the tongue has a plastic base section with a wedge-shaped cross section, which longitudinally is divided approximately in half, one end having a forked region with a longitudinal slot dividing the leg of the spring clip from the remainder of 16 body of the inserted tongue, and the other side having a bore-receiving region equipped with a metal insert bushing, which contains the threaded bore.

8. The inserted tongue of claim 7, wherein the bore-receiving region of the plastic base section has a penetrating receiving bore, which contains the metal insert bushing and a flat recess disposed above this, with which the metal insert bushing makes contact by means of an appropriate edge flange with the underside of the T-sections of the undercut contoured grooves.

9. The inserted tongue of claim 8, wherein, on the top of the plastic base section, anti-twisting protrusions are positioned on both sides of the metal insert bushing, which contains the threaded bore, such that, when the inserted tongue is positioned within the contoured groove, said protrusions extend into the outwardly directed slot of the undercut contoured groove.

10. The inserted tongue of claim 9, wherein the edge flange on the metal insert bushing has a rectangular contour and wherein clamping profiles are situated at those edges of the anti-twist protrusions, which face the edge flange, said clamping profiles exerting a slight clamping grip over the corresponding edges of the edge flange.

11. An inserted tongue for use in a T-shaped, undercut groove of a profiled bar, comprising a body composed of a predominantly polymeric material, and having a generally elongated wedge configuration incorporating at one end of a clamping means for clamping said inserted tongue in the undercut grooves of the profiled bar, said clamping means comprising a leg of a resilient spring clip formed from a portion of the polymer material along an apex of the wedge configuration which extends at a slight angle to the longitudinal axis of the inserted tongue, and wherein said spring clip has a clamping point arranged and adapted to contact the floor of the undercut groove of the profiled bar.

12. An inserted tongue according to claim 11 wherein said body of the inserted tongue is longitudinally divided into a forked region wherein a longitudinal slot divides the polymeric leg of the spring clip, from an underlying portion of the polymeric body and a bore-receiving region having a slot in the surface of the body adapted to receive a metal insert bushing said bushing having a central orifice for receipt of a fastener and being wider than the opening in the profiled bar.

13. An inserted tongue in accordance with claim 12 wherein said clamping point on the spring clip is positioned toward the end of the polymeric leg of the spring clip and incorporates a clamping knob integrally attached to the underside of the free end of said leg of the spring clip.

14. An inserted tongue in accordance with claim 13 additionally including two spaced anti-twisting protrusions integrally formed on the upper portion of the bore receiving portion of the bore receiving portion of the body of the inserted tongue.

15. An inserted tongue in accordance with claim 14 wherein on the upper portion of said body of said anti-twisting protrusions are engaged with both sides of said metal insert bushing such that said protrusions extend into the outwardly directed slot of said undercut groove.

16. An inserted tongue in accordance with claim 15 wherein said edge flange has a rectangular contour and wherein clamping edges are situated at the edges of said anti-twist protrusions in a position to exert a clamping action upon corresponding edges of upper edge flanges of the undercut groove of the profiled bar.

17. An insertable fitting for retention in an undercut groove of a profiled bar comprising:
   (a) a polymeric body portion,
   (b) one end of said body portion being bifurcated to form an upper continuation of the polymeric body portion and a lower resilient spring portion arranged and adapted to resiliently contact a lower portion of the undercut groove in the profiled bar at a contact point positioned toward the bifurcated end of said body portion and upon the polymeric spring portion,
   (c) the other end of the body portion being recessed on the upper side to receive a threaded metal bushing.

18. An insertable fitting in accordance with claim 17 wherein the contact point of the lower resilient spring portion with the undercut groove is comprised of a contact knob secured to the resilient spring portion.

19. An inserted fitting in accordance with claim 17 additionally comprising a metal bushing in the recessed upper portion of the body portion into which attachment means may be threaded.

20. An inserted fitting in accordance with claim 19 wherein the body portion incorporates anti-twisting sections at both ends of the upper portion of the bushing adapted to engage lower portions of lateral flanges forming the upper portion of the undercut groove.

21. An inserted tongue, which can be swung into T-shaped, under cut contoured grooves of profiled bars, with an essentially wedge-shaped cross section, the wedge apex line of which points to the contoured groove floor and contacts it at a clamping point when the inserted tongue is in its swung-in position, together with a threaded bore directed perpendicular to the wedge apex line, wherein the inserted tongue has a leg of a plastic spring clip, which extends longitudinally in the region of its wedge apex line, the free, spring-elastic end of said leg having a clamping point making contact with the floor of the undercut contoured groove and wherein the inserted tongue has a plastic base section with a wedge-shaped cross section, which longitudinally is divided approximately in half, one side having a forked region with a longitudinal slot forming the leg of the spring clip, and the other side having a bore-receiving region equipped with a metal insert bushing, which contains the threaded bore, and wherein the bore-receiving region of the plastic base section has a penetrating receiving bore, which contains the metal insert bushing and a flat recess disposed above this, with which the metal insert bushing makes contact by means of an appropriate edge flange, and wherein, on the top of the plastic base section anti-twisting protrusions are integrally attached to both sides of the metal insert bushing, which contains the threaded bore, such that, when the inserted tongue is swung into the undercut contoured groove, said protrusions extend into the outwardly directed slot of the undercut contoured groove.

22. The inserted tongue of claim 21, wherein the edge flange on the metal insert bush has a rectangular contour and wherein clamping edges are situated at those edges of the anti-twist protrusions, which face the edge flange, said clamping edges exerting a slight clamping grip over the corresponding edges of the edge flange.

23. An inserted tongue, which can be swung into T-shaped, under cut contoured grooves of profiled bars with an essentially wedge-shaped cross section, the wedge apex line of which points to the contoured groove floor and contacts it at a clamping point when the inserted tongue is in its swung-in position, together with a threaded bore directed perpendicular to the wedge apex line, wherein the inserted tongue has a leg of a plastic spring clip, which extends longitudinally in the region of its wedge apex line, the free, spring-elastic end of said leg having a clamping point making contact with the floor of the undercut contoured groove, wherein the clamping point consists of a clamping knob integrally attached to the underside of the free end of the plastic leg of the spring clip, and wherein the inserted tongue has a plastic base section with a wedge-shaped cross section, which longitudinally is divided approximately in half, one side having a forked region with a longitudinal slot forming the leg of the spring clip, and the other side having a bore-receiving region equipped with a metal insert bushing, which contains the threaded bore, wherein the bore-receiving region of the plastic base section has a penetrating receiving bore, which contains the metal insert bushing and a flat recess disposed above this, with which the metal insert bushing makes contact by means of an appropriate edge flange, and wherein, on the top of the plastic base section, anti-twisting protrusions are integrally attached to both sides of the metal insert bushing, which contains the threaded bore, such that, when the inserted tongue is swung into the undercut contoured groove, said protrusions extend into the outwardly directed slot of the undercut contoured groove.

24. The inserted tongue of claim 23, wherein the edge flange on the metal insert bushing has a rectangular contour and wherein clamping edges are situated at those edges of the anti-twist protrusions, which face the edge flange, said clamping edges exerting a slight clamping grip over the corresponding edges of the edge flange.

25. An inserted tongue for use in a T-shaped, undercut contoured groove of a profiled bar, the body of which tongue is composed of a polymeric material, and having a clamping means for clamping said inserted tongue in the groove of the profiled bar, wherein said clamping means comprises a leg of a spring clip formed from a polymeric material which extends at a slight angle to the longitudinal axis or extension of the inserted tongue, and wherein said leg has a clamping point arranged and adapted to contact the floor of the undercut contoured groove of a profiled bar wherein said body of the inserted tongue is longitudinally divided into a forked region with a longitudinal slot dividing the leg of the spring clip, from a bore-receiving region comprising:
   (a) a receiving bore
   (b) a metal insert bushing
   (c) a flat recess in the bore receiving region
   (d) a contact means for said metal insert bushing with said flat recess, and
   wherein said clamping point incorporates a clamping knob integrally attached to the underside of the free end of said leg of the spring clip, and additionally including anti-twisting protrusions integrally formed on the upper portion of the bore receiving portion of the body of the inserted tongue.

26. An inserted tongue in accordance with claim 25 wherein the upper portion of the body of said anti-twisting protrusions are engaged with both sides of said metal insert bushing so that said protrusions may extend into the outwardly directed slot of said undercut contoured groove.

27. An inserted tongue in accordance with claim 26 wherein said edge flange has a rectangular contour and wherein the clamping edges are situated at the edges of said anti-twist protrusions in apposition to exert a clamping action upon corresponding edges of upper edge flanges of the undercut contoured grooves of profiled bars.

28. An insertable fitting for retention in an undercut groove of a profiled bar comprising:
 (a) a polymeric body portion,
 (b) one end of said body portion being bifurcated to form an upper continuation of the polymeric body portion and a lower resilient spring portion arranged and adapted to resiliently contact the lower portion of the undercut groove in the profiled bar at a contact point positioned toward the end of said polymeric spring portion, wherein the contact point is comprised of a contact knob secured to the resilient spring portion and additionally comprising a metal bushing in the upper portion of the body portion into which attachment means may be threaded, and wherein the metal bushing incorporates anti-twisting sections at both sides of the upper portion of the bushing adapted to engage lower portions of lateral flanges forming the upper portion of the undercut groove of the profiled bar.

\* \* \* \* \*